United States Patent
Bush et al.

(10) Patent No.: US 10,075,450 B2
(45) Date of Patent: Sep. 11, 2018

(54) ONE TIME USE PASSWORD FOR TEMPORARY PRIVILEGE ESCALATION IN A ROLE-BASED ACCESS CONTROL (RBAC) SYSTEM

(71) Applicant: Rockwell Automation Technologies, Inc., Mayfield Heights, OH (US)

(72) Inventors: Michael A. Bush, Hudson, OH (US); Clark L. Case, Aurora, OH (US); Taryl J. Jasper, South Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 33 days.

(21) Appl. No.: 15/153,663

(22) Filed: May 12, 2016

(65) Prior Publication Data

US 2016/0352752 A1 Dec. 1, 2016

Related U.S. Application Data

(60) Provisional application No. 62/168,317, filed on May 29, 2015.

(51) Int. Cl.
  *H04L 29/06* (2006.01)
(52) U.S. Cl.
  CPC ........ *H04L 63/105* (2013.01); *H04L 63/0838* (2013.01); *G05B 2219/24154* (2013.01); *H04L 63/0428* (2013.01)
(58) Field of Classification Search
  CPC .............. H04L 63/0838; H04L 63/105; H04L 63/0428; G05B 2219/24154
  See application file for complete search history.

(56) References Cited

U.S. PATENT DOCUMENTS

| 7,685,430 B1* | 3/2010 | Masurkar ................ G06F 21/31 380/255 |
| 8,151,323 B2* | 4/2012 | Harris ................ H04L 63/0272 726/13 |
| 8,321,682 B1* | 11/2012 | Read ..................... H04L 9/3228 380/44 |
| 9,118,656 B2* | 8/2015 | Ting ..................... H04L 63/104 |

(Continued)

FOREIGN PATENT DOCUMENTS

| DE | 10200681 A1 | 7/2003 |
| EP | 2442528 A1 | 4/2012 |
| WO | 2015071770 A2 | 5/2015 |

OTHER PUBLICATIONS

European search report issued in EP Application No. 16171891.1-1951 dated Oct. 7, 2016, 11 pages.

*Primary Examiner* — Don G Zhao

(57) ABSTRACT

Techniques to facilitate temporary escalation of access privileges for a control program associated with a machine system in an industrial automation environment are disclosed. In at least one implementation, a request is received from a user for a temporary access level increase to utilize protected functions of the control program. An encrypted string is generated comprising a temporary password authorized to access the protected functions of the control program. The encrypted string is provided to the user, wherein the user provides the encrypted string to an administrator and the administrator authenticates the user for the temporary access level increase, decrypts the temporary password, and provides the temporary password to the user. A login request is received from the user with the temporary password, and the temporary access level increase is responsively granted to allow the user to utilize the protected functions of the control program.

20 Claims, 4 Drawing Sheets

(56) References Cited

U.S. PATENT DOCUMENTS

| | | | | |
|---|---|---|---|---|
| 9,641,335 B2* | 5/2017 | Bruce | | H04L 9/32 |
| 9,769,179 B2* | 9/2017 | Pal | | H04L 63/105 |
| 2003/0137398 A1* | 7/2003 | Shibata | | B60R 25/04 |
| | | | | 340/5.61 |
| 2006/0069914 A1* | 3/2006 | Rupp | | H04L 9/32 |
| | | | | 713/168 |
| 2008/0212781 A1* | 9/2008 | Vennelakanti | | G06F 21/6218 |
| | | | | 380/277 |
| 2008/0235521 A1* | 9/2008 | Gosselin | | G06F 21/6218 |
| | | | | 713/193 |
| 2008/0313473 A1* | 12/2008 | Provencher | | G06F 21/554 |
| | | | | 713/191 |
| 2009/0106561 A1* | 4/2009 | Ejiri | | G06F 21/62 |
| | | | | 713/193 |
| 2009/0276623 A1* | 11/2009 | Jevans | | G06F 21/6209 |
| | | | | 713/155 |
| 2010/0306554 A1* | 12/2010 | Nunez-Tejerina | | |
| | | | | G06F 21/6209 |
| | | | | 713/193 |
| 2011/0126023 A1* | 5/2011 | Wang | | G06F 21/6209 |
| | | | | 713/182 |
| 2013/0054976 A1* | 2/2013 | Brown | | G06F 21/6218 |
| | | | | 713/189 |
| 2013/0067217 A1* | 3/2013 | Matzkel | | G06F 21/41 |
| | | | | 713/155 |
| 2013/0078605 A1* | 3/2013 | Toussaint, Jr. | | G09B 7/02 |
| | | | | 434/362 |
| 2013/0345855 A1* | 12/2013 | Tsai | | B29C 45/7666 |
| | | | | 700/200 |
| 2014/0108811 A1* | 4/2014 | Kanungo | | H04L 63/0442 |
| | | | | 713/183 |
| 2014/0201536 A1* | 7/2014 | Fiske | | H04L 9/0844 |
| | | | | 713/183 |
| 2014/0282980 A1 | 9/2014 | Kolluru et al. | | |
| 2014/0283121 A1* | 9/2014 | Livshits | | G06F 21/45 |
| | | | | 726/28 |
| 2015/0281287 A1* | 10/2015 | Gill | | G06F 21/55 |
| | | | | 726/1 |
| 2016/0364562 A1* | 12/2016 | Hayes | | G06F 21/35 |

* cited by examiner

ONE TIME USE PASSWORD FOR TEMPORARY PRIVILEGE ESCALATION IN A ROLE-BASED ACCESS CONTROL (RBAC) SYSTEM

RELATED APPLICATIONS

This application claims the benefit of, and priority to, U.S. Provisional Patent Application No. 62/168,317, entitled "ONE TIME USE PASSWORD FOR TEMPORARY PRIVILEGE ESCALATION IN A ROLE-BASED ACCESS CONTROL (RBAC) SYSTEM", filed May 29, 2015, which is hereby incorporated by reference in its entirety for all purposes.

TECHNICAL FIELD

Aspects of the disclosure are related to computing hardware and software technology, and in particular to industrial automation applications.

TECHNICAL BACKGROUND

Industrial automation environments utilize machines during the industrial manufacturing process, such as drives, pumps, motors, and robots. These machines typically have various moving parts and other components that are driven by instructions received from industrial controller systems. Machine builders and Solution Providers typically produce the control logic needed to run on these controllers to control the machines. The machine builders and Solution Providers often attempt to restrict access to and usage of the controller logic they produce, both internally and by end users.

In addition to controller logic, other content may be employed or generated during industrial automation operations, such as data sets, drive parameters, cam tables, product formulations, recipes, production data, and human-machine interface (HMI) components. An HMI receives and processes status data from the machines to generate various graphical displays. For example, an HMI graphical display might indicate status metrics of a drive, the pressure of a pump, the speed of a motor, or the output of a robot. The HMI may also provide a mechanism for an operator to send control instructions to an industrial controller system that controls a machine. For example, an operator might use the HMI to direct the control system to update drive parameters, turn on a pump, speed-up a motor, or stop a robot.

Overview

Provided herein are systems, methods, and software to facilitate temporary escalation of access privileges for a control program associated with a machine system in an industrial automation environment. In at least one implementation, a request is received from a user for a temporary access level increase to utilize protected functions of the control program. An encrypted string is generated comprising a temporary password authorized to access the protected functions of the control program. The encrypted string is provided to the user, wherein the user provides the encrypted string to an administrator and the administrator authenticates the user for the temporary access level increase, decrypts the temporary password, and provides the temporary password to the user. A login request is received from the user with the temporary password authorized to access the protected functions of the control program, and the temporary access level increase is responsively granted to allow the user to utilize the protected functions of the control program.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
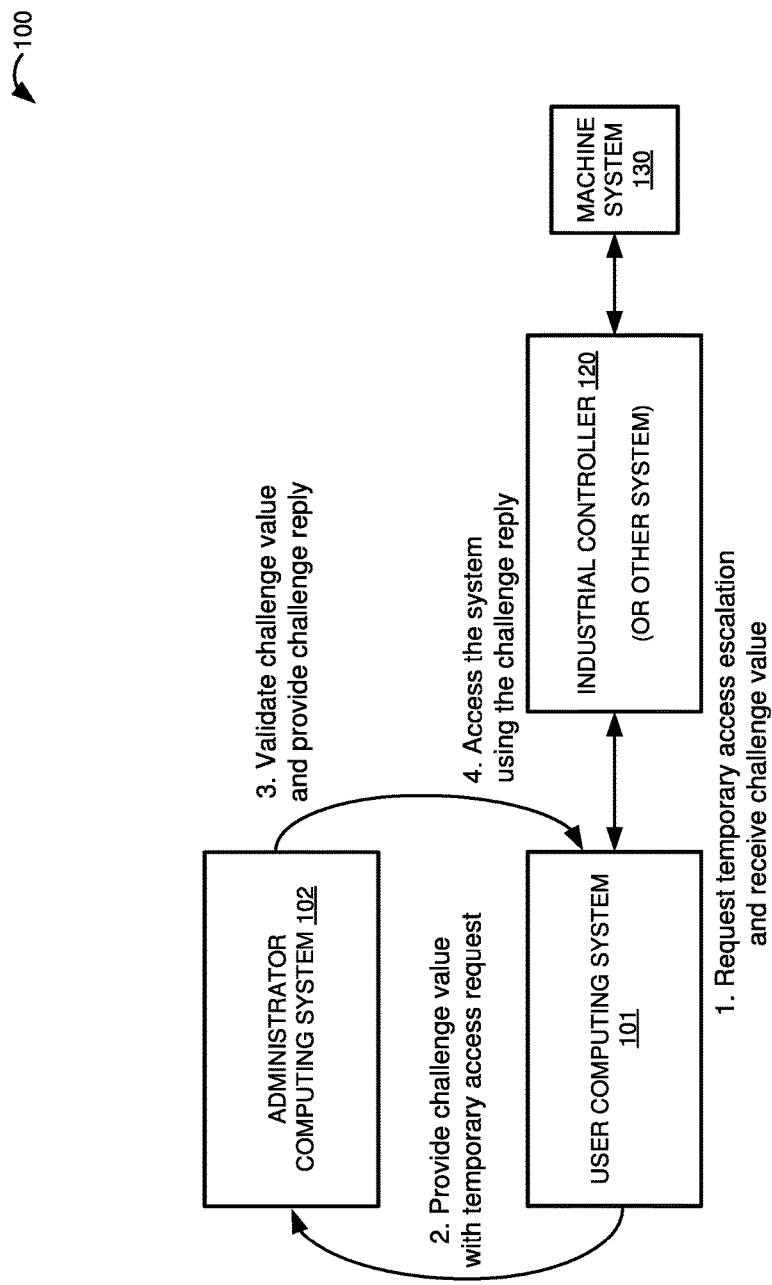
FIG. 1 is a block diagram that illustrates an industrial automation environment and an operational scenario that describes a temporary access process in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for techniques to facilitate temporary escalation of access privileges for an application associated with an industrial automation environment. Typically, integrated architecture control systems are utilized by Original Equipment Manufacturer (OEM) machine builders, solution providers, or system integrators to produce machine logic, configuration data, routines, and add-on instructions (AOIs) used to program logic controllers that control the operation of machines, and such control logic is often protected from being viewed, edited, deleted, executed, and other actions by unauthorized parties. Occasionally, a technician or some other user will require temporary access to control logic of a controller or some other functions of an application to perform a repair or service. These privileges may include the right to make changes to a product (such as flashing the firmware on a controller), make changes to a control program, access hidden or secured sections of program code, and other functions.

An OEM typically produces machines that contain one or more devices that require user authentication prior to accessing or modifying the configuration of those devices. Typically, the machines are preconfigured with particular user groups or roles that allow certain predefined access privileges such as program download, program upload, program change, firmware update, and the like. Such machines may support a connection to a Role-Based Access Control (RBAC) authentication and authorization (A&A) authority that contains the username, password, role, and privileges for each user that is allowed to access the OEM machine and devices. In a large facility, the A&A authority would be centrally located, centrally configured and shared across many machines to allow for easy administrative changes such as adding credentials for a new employee, removing the credentials for a terminated employee and changing privilege levels.

On an isolated machine that is not located in the facility, or if a network connection to a central A&A system is unreliable or unavailable, the A&A authority may be deployed locally on the machine to enable secure, authenticated user access. Unfortunately, the administration of a remote machine-based A&A authority containing the authorized users and their access privileges is extremely difficult. Because the machine is not always remotely accessible via some secured channel, an authorized administrator often cannot gain access to make A&A changes. Therefore, these isolated machines are typically only preconfigured for a set of roles which are mapped to set of privileges, and would not contain individual usernames and passwords for each user because they change too frequently. Instead, the machine might get configured with a set of well known usernames and passwords (typically one for each role) that are then provided to users that need to access the machine. However, this technique could lead to security breaches because a user could learn the username and password for a more privileged role and then access the system using that user account.

An alternative solution uses a trusted authority mechanism where the isolated machine grants access to any user that has previously received authentication by a trusted security authority. In this case, the user first authenticates to the managed, central authority from a computer that the user intends to use at a later time to service the remote machine. That computer will then store a cached copy of the roles or groups of which the user is a member. The user can then disconnect from the central authority and later connect to the isolated machine with no connection to the central authority. This cache is tamper resistant and has a limited lifespan to allow the user enough time to travel to the isolated machine and login to the computer while being disconnected from the authority to perform the necessary service work.

Unfortunately, after traveling long distances to repair an isolated machine, such as an on an off-shore oil platform or remote pumping station, a technician may find that different security privileges than the technician's role affords are required to complete the work. These privileges may include the right to make changes to a product, such as flashing the firmware on a controller, the ability to make changes to a control program, access hidden or secured sections of program code, or any other protected functions. Without the ability to update the local machine security authority or the security authority cached on the technician's service computer, the technician has no ability to complete the service of the machine.

One solution to this problem involves preconfiguring a set of higher-privileged user credentials in advance that could be provided to the technician when this situation arises. However, once the technician learns the special set of privileged credentials, there is nothing preventing the technician from reusing them to access these higher privileges on other machines without receiving authorization. Alternatively, if these credentials are set up as one-time use, the first technician could gain access to the machine, but any service technicians who subsequently attempt to utilize these credentials at a later date would be prevented from access.

To address these issues, the techniques disclosed herein enable a technician to contact an administrator or some other authority with appropriate credentials and request a temporary escalation of privileges for the purpose of servicing a machine or system. The administrator can approve such a temporary access level increase to allow the technician to access the machine and finish the work. After the service is complete, the original access privileges for the technician would be restored to pre-escalation levels.

Figure 2:
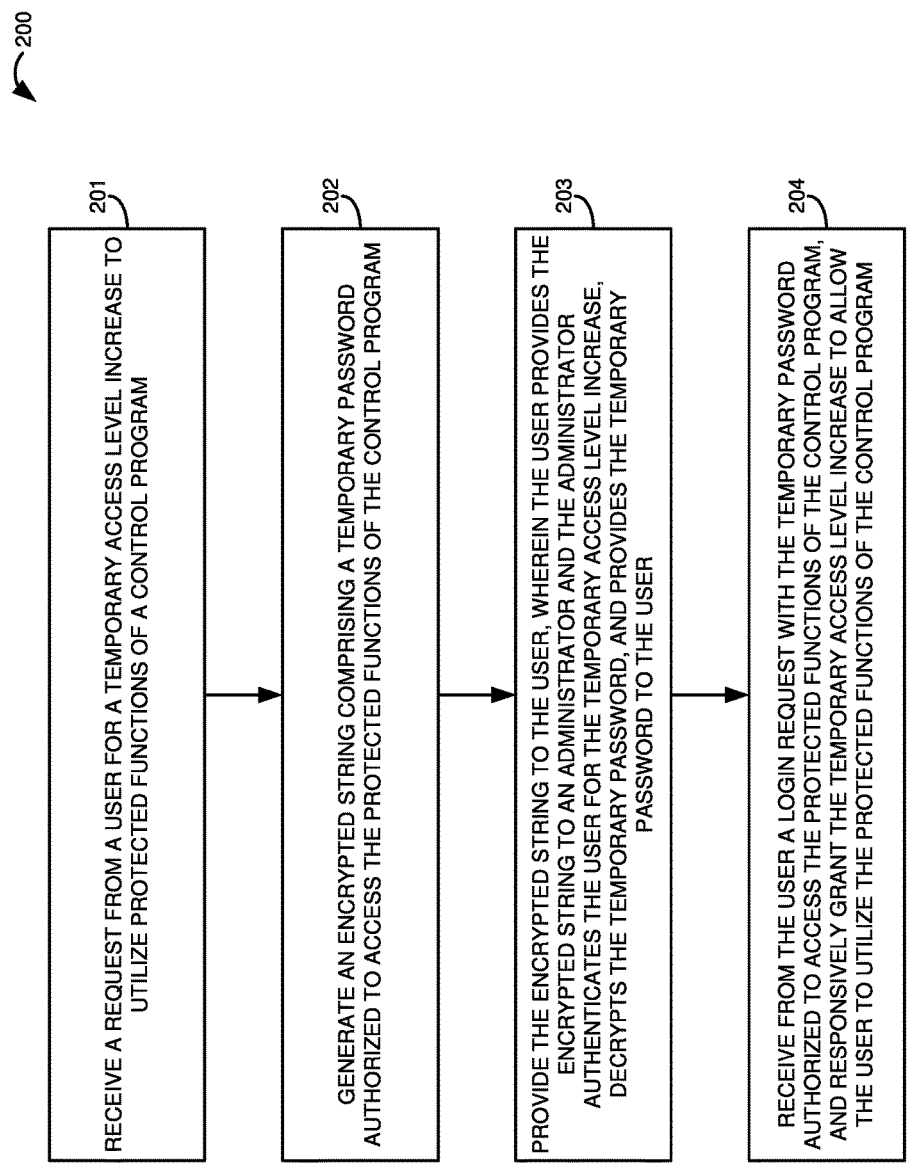
FIG. 2 is a flow diagram that illustrates an operation of a computing system in an exemplary implementation.
Figure 3:
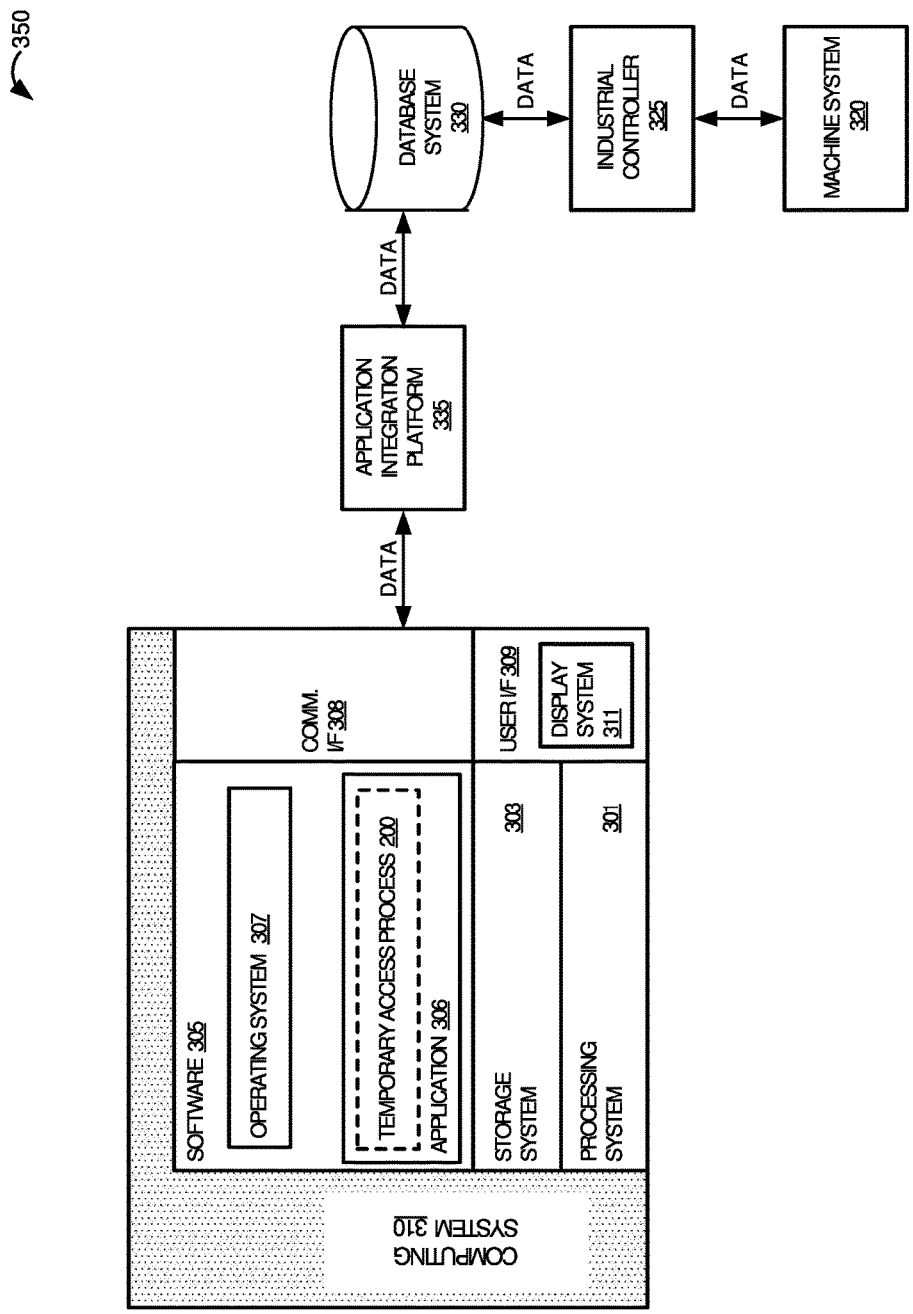
FIG. 3 is a block diagram that illustrates an operational scenario involving a computing system in an industrial automation environment in an exemplary implementation.
Figure 4:
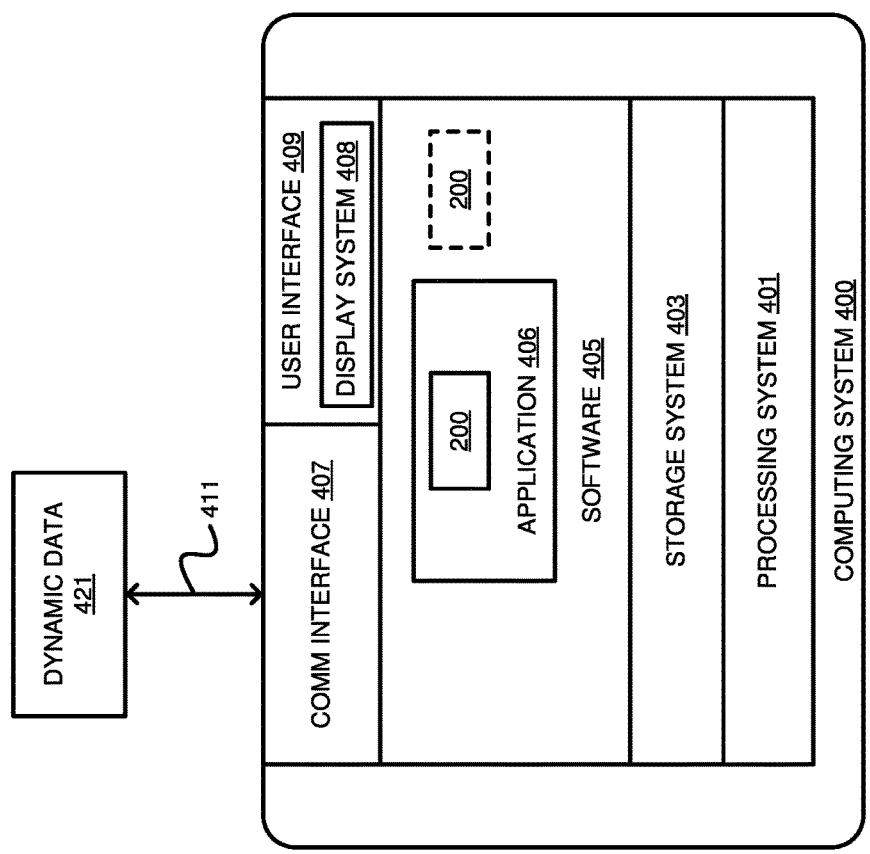
FIG. 4 is a block diagram that illustrates a computing system in an exemplary implementation.

Referring now to the drawings, FIG. 1 illustrates an exemplary industrial automation environment that describes a technique of temporarily increasing a user's access level. FIG. 2 illustrates an operation of a computing system in an exemplary implementation. FIG. 3 illustrates an exemplary industrial automation environment that includes a computing system that may be used to execute a temporary access process, and FIG. 4 illustrates an exemplary computing system that may be used to perform any of the processes and operational scenarios described herein.

Turning now to FIG. 1, a block diagram that illustrates industrial automation environment 100 in an exemplary implementation is shown. Industrial automation environment 100 includes user computing system 101, administrator computing system 102, industrial controller 120, and machine system 130. Industrial controller 120 and machine system 130 are in communication over a communication link. In some examples, user computing system 101 could be running a control program editor, such as an RSLogix™ system or a Studio 5000® Logix Designer provided by Rockwell Automation, Inc. Note that there would typically be many more machine systems in most industrial automation environments, but the number of machine systems shown in FIG. 1 has been restricted for clarity.

Industrial automation environment 100 comprises an automobile manufacturing factory, food processing plant, oil drilling operation, microprocessor fabrication facility, or some other type of industrial enterprise. Machine system 130 could comprise a sensor, drive, pump, filter, drill, motor, robot, fabrication machinery, mill, printer, or any other industrial automation equipment, including their associated control systems. A control system comprises, for example, industrial controller 120, which could include automation controllers, programmable logic controllers (PLCs), or any other controllers used in automation control. In some examples, industrial controller 120 could comprise a ControlLogix® control system provided by Rockwell Automation, Inc. Additionally, machine system 130 could comprise other industrial equipment, such as a brew kettle in a brewery, a reserve of coal or other resources, or any other element that may reside in an industrial automation environment 100.

An exemplary operation of industrial automation environment 100 is illustrated in FIG. 1, the order of which is designated by the numerals one through four, but note that some of the steps could be performed in different orders in some examples or in other operations described herein. Initially, a user of computing system 101 requests a temporary access escalation to perform one or more protected operations associated with controller program code that may be executed by industrial controller 120 to drive machine system 130. The user is not ordinarily authorized to perform the desired operations but is requesting temporary authorization in order to make a repair or perform some other legitimate service. In response to the request for the temporary access escalation, the user receives a challenge value that can be provided to an administrator, a delegate of the administrator, or some other qualified individual to authenticate and authorize the user's request. The challenge value could be determined by computing system 101 for inclusion in the request in several ways. For example, computing system 101 could request an access level increase from a machine authority associated with controller 120 and/or machine system 130, which could respond with an encrypted string for the user to provide to the administrator as the challenge value. In another example, the user could execute a tool on computing system 101 that runs an algorithm to generate the encrypted string transparently to the user. The encrypted string could include various information, including a username of the user, a role of the user in an organization, the temporary role or access level increase requested by the user, a temporary password pre-authorized to provide the requested access, the name or globally unique identification (GUID) of the machine authority or some other machine identifier, along with any other information. The user cannot decrypt the encrypted string to view the temporary password, but the administrator is able to process the string in the challenge value.

The user provides the challenge value with the temporary access request to the administrator using computing system 102. The administrator authenticates the user's identity and validates the challenge value. Upon successful authentication, the administrator provides a challenge reply to the user of computing system 101. In some examples, the challenge reply comprises the decrypted temporary password. The challenge reply may then be used by the user of computing system 101 to access the system and utilize the requested functions. Advantageously, upon receipt of the challenge reply, the user is able to execute the protected functions and perform the work immediately, and the temporary password is preconfigured to only work temporarily so that the user does not retain increased access rights after the work is completed. For example, the password may only be valid for a single use or for a predetermined number of uses, or may only be valid for a predetermined time period, or both, such as remaining valid for a predefined number of uses within a certain time period, where the exhaustion of either the preset number of uses or the time period invalidates the password. An exemplary operation to facilitate temporary escalation of access privileges for a control program associated with a machine system in an industrial automation environment will now be discussed with respect to FIG. 2.

FIG. 2 is a flow diagram that illustrates an operation 200 in an exemplary implementation. The operation 200 shown in FIG. 2 may also be referred to as temporary access process 200 herein. The steps of the operation are indicated below parenthetically. The following discussion of operation 200 will proceed with reference to computing systems 101 and 102, industrial controller 120, and machine system 130 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate temporary escalation of access privileges for a control program associated with a machine system in an industrial automation environment. In some examples, operation 200 may be performed by computing system 101, industrial controller 120, and/or machine system 130, although operation 200 could be executed by any system or device having a machine authority associated with machine system 130. As shown in the operational flow of process 200, a request is received from a user of computing system 101 for a temporary access level increase to utilize protected functions of a control program (201). The control program comprises typically controller program code that directs industrial controller 120 to drive machine system 130. In some examples, either prior to or concurrently with requesting the temporary access level increase, the user may access machine system 130 by entering the user's previously-assigned username and password in order to identify the user to the system and receive the standard access privileges afforded to the user, which in this example would not include the protected functions of the control program. Some examples of protected control program functions include the ability to make changes to a product, such as flashing the firmware on industrial controller 120, making changes to the control program, including viewing, editing, or executing the logic source code or certain portions thereof, accessing hidden or secured sections of program code, control program upload, control program download, and any other protected features or functions of the control program, industrial controller 120, and/or machine system 130.

Responsive to receiving the request for the temporary access level increase, an encrypted string is generated comprising a temporary password authorized to access the protected functions of the control program (202). Typically, the temporary password is predefined for the escalated role or increased access level requested by the user, and is intended for the user to temporarily access the system at the increased access level. In some examples, the temporary password could be generated in response to receiving the request for the temporary access level increase. For example, the temporary password could be generated dynamically upon receiving the user's request for the temporary access level increase. In this manner, the user, or other users, can make several requests for temporary access at different times, and a different temporary password would be generated, encrypted, and provided for each request. The temporary password could be generated by computing system 101, industrial controller 120, or any other system or device. In some examples, generating the encrypted string could comprise generating the temporary password authorized to access the protected functions of the control program and including the temporary password in the encrypted string. In addition to the temporary password pre-authorized to provide the requested access, the encrypted string could comprise other information, including a username of the user, a role of the user in an organization, the temporary role or access level increase requested by the user, the name or globally unique identification (GUID) of the machine authority or some other identifier associated with industrial controller 120 and/or machine system 130, along with any other desired information. In some implementations, only the temporary password is provided to the user in an encrypted format, and any other information is not encrypted.

The encrypted string is provided to the user, wherein the user provides the encrypted string to an administrator and the administrator authenticates the user for the temporary access level increase, decrypts the temporary password, and provides the temporary password to the user (203). Since the temporary password is provided to the user in the encrypted string, and the user does not have the ability to decrypt the string, the user cannot view or use the password at this time. Instead, the user contacts the administrator to provide the encrypted string to the administrator. The user may utilize any method of communication to contact the administrator and provide the encrypted string, such as a voice call, short message service (SMS) text message, two-way radio, instant message, satellite transmission, wireless communication, or any other method of contact. The administrator represents any trusted individual within an organization that produced the control program, industrial controller 120, and/or machine system 130, such as an Original Equipment Manufacturer (OEM), solution provider, machine builder, system integrator, or some other controlling entity. For example, the administrator could comprise security personnel, a service engineer, a delegate of the manufacturer, or any other individual with security clearance to authorize the temporary access level increase for the user. Typically, the administrator manually authenticates and authorizes the user for the requested temporary access level increase, which could include verifying the user's credentials and assigned role within the organization, verifying other information such as identifiers associated with the user's contact method used to provide the encrypted string to the administrator, requesting additional identifying information from the user, or any other authentication techniques. When the administrator is satisfied that the user's request is authentic and the user is authorized to receive the temporary access level increase, the administrator decrypts the temporary password and provides the temporary password to the user. Typically, administrator computing system 102 has a software tool installed thereon which has the ability to decrypt the encrypted string. Once decrypted, the administrator provides the temporary password to the user in a decrypted format using any available method of contact, such as verbally, textual reply message, or any other form of communication.

A login request is received from the user with the temporary password authorized to access the protected functions of the control program, and the temporary access level increase is responsively granted to allow the user to utilize the protected functions of the control program (204). Because the temporary password was issued to provide the user with a temporary access level increase to utilize protected functions of the control program, when the user logs in using the temporary password, the system grants the user the privileges that were predefined for the escalated role requested by the user. Typically, the temporary password is preconfigured to only work temporarily so that the user does not retain increased access rights after the work is completed. In some examples, the password may only be valid for a predetermined number of uses and/or may only be valid for a predetermined time period. In at least one implementation, the time period of validity may not start until the password is first used. For example, there may be no limit on the number of times the user may use the temporary password, but the password is only valid when used within a predetermined time period after the first time the user enters the password, such as eight hours. In another example, to provide the temporary access level increase to the user, the temporary password may be used by the user three times within a four-hour time period to access the protected functions of the control program. Of course, the password could be valid for any number of uses and/or any predefined time period. In some implementations, the password may only be valid for a single use, so once the user logs in with the temporary password, the password cannot be used again by the user. Once the number of uses has been exceeded and/or the predetermined time period has expired, the system may delete the temporary password from its memory or otherwise mark the password as invalid, thereby rendering the temporary password ineffective for future login attempts by the user. Thus, only the privileges originally assigned to the user will be granted on subsequent logins by the user according to the user's previously-assigned password. Once the password is rendered invalid, the user would have to request another temporary password for escalated privileges if the user requires access to the protected functions of the control program in the future.

Advantageously, the above techniques enable a user to receive a temporary escalation of access privileges to utilize protected functions of a control program when servicing a machine system that may be isolated or otherwise unable to contact a central security authority. The user can contact an administrator to provide an encrypted string comprising a temporary password authorized to access the protected functions of the control program, and if the administrator approves of the temporary access level increase requested by the user, the temporary password can be decrypted and provided to the user which will enable the user to utilize the protected functions of the control program. The temporary password eventually expires and is rendered invalid to prevent any unauthorized access in the future. By protecting the control program in this manner, the techniques described herein provide the technical advantage of electronically safeguarding proprietary data from unauthorized access, execution, and any other use. Further, by eliminating unauthorized requests to access and use the control program associated with industrial controller 120 and/or machine system 130, the load on the processors, drives, mechanical components, and other elements in the industrial automation environment may be reduced, resulting in significant energy savings by avoiding unnecessary unauthorized operations. Beneficially, manufacturers of control programs, industrial controller 120, and/or machine system 130 can better protect and manage access to their proprietary data and equipment, while still enabling service workers to complete their tasks in a timely and efficient manner.

Illustrative examples of possible implementations of employing a one-time use password for temporary privilege escalation in a Role-Based Access Control (RBAC) system will now be discussed. The following examples could be executed by computing system 101 and other elements of industrial automation environment 100, and could also be combined with operation 200 of FIG. 2 in some implementations.

In a first example, a user is allowed to contact an administrator in some simple manner, such as telephone, mobile phone, satellite phone, SMS messaging, and the like, to request a temporary escalation of privileges for the purpose of servicing a specific machine that does not have a network connection to a central security authority. The administrator can manually approve such a temporary escalation of privilege request, such as verbally, reply text, or some other method of communication, to allow the user to access the machine and finish the work. After the service visit is complete, the original access privileges are restored to the pre-escalation levels. The process would occur as follows.

(1) The user accesses the machine normally using the previously-assigned username and password stored on the trusted cached authority on the user's laptop or on the isolated machine authority.

(2) After step (1) is completed, the user sends a request to the machine authority requesting temporary access to a role the user is not authorized for but that is necessary to complete the job.

(3) The machine authority returns to the user an encrypted string as a response to the user's request for access. The encrypted string typically contains the user's name and assigned role, the temporary role requested by the user, a temporary password, the name or globally unique identification (GUID) of the machine authority that assigned when the machine was built, and any other pertinent information.

(4) The user then contacts the administrator by voice call, text message, or some other contact method and communicates the encrypted string provided by the machine authority to the administrator.

(5) The administrator decrypts the string, verifies the user's name, role, requested temporary role, and machine identifier. The administrator then approves or denies the request for role escalation.

(6) If the request is approved, the administrator provides the user with the decrypted temporary password.

(7) The user then logs in to the machine authority with the user's normal username and the temporary password provided by the administrator.

(8) Based on receiving the temporary password in the user login, the machine authority grants the user the privileges that were pre-defined for the escalated role associated with the temporary password.

(9) The user finishes the work, logs off and disconnects from the machine.

(10) At some pre-defined time after the user logs off, the machine authority deletes the temporary password. Accordingly, any future login attempts by this user on this or any other machine will only grant the original privileges defined in the user's assigned role.

In another exemplary workflow, an OEM or machine builder will typically have two roles in their organization, field engineers and field technicians, that interact with control systems and other software installed on the machines they manufacture for end users. Field engineers typically have greater access and privileges to the logic controller than the field technicians. However, it is very common for a field technician to be dispatched to a machine in the field to troubleshoot a problem. The field technician typically has access rights sufficient for troubleshooting the software, but may not have sufficient access to actually complete any service or repair work. Unfortunately, the field engineer often has to physically travel to the site in order to login, or the field engineer just tells the technician the engineer's credentials over the phone. The technician can then login to the software using the engineer's credentials, but these credentials have then been compromised as the technician could use them for unauthorized access outside of the immediate issue.

However, to avoid these drawbacks, a special account can be established that allows authorized users to create temporary passwords even if two different users do not have network connectivity to each other. In this exemplary workflow, the field technician at the remote work site can run a software tool on the technician's service computer that generates a challenge value. The technician then contacts the field engineer, either through a voice call, short message service (SMS) text message, or any other means of communication. The field engineer's computer has a similar tool installed thereon that also generates a challenge value. The field technician communicates the challenge value generated by the technician's laptop to the engineer, and the engineer enters the challenge value into the tool running on the engineer's computer. If the challenge values match, and if the engineer is confident that the technician is authentic, then the engineer operates the tool on the engineer's computer to generate a challenge reply.

The engineer communicates the challenge reply to the technician, and the technician enters the challenge reply into the tool on the technician's computer. If accepted, the tool on the technician's computer will allow the field technician to access the logic as if the technician were the engineer. The access is typically only valid for a single use and will expire after a predetermined time period, such as two hours. The challenge reply functions as a password that has been pre-authorized to work on the technician's laptop to provide the requested access, even when the laptop is not connected to a communication network, such as the Internet. In some cases, the technician's computer could have previously downloaded the pre-authorized challenge reply password when connected to the Internet before the technician traveled to the remote location, and this password could be encrypted and stored in secure storage on the technician's computer and be preconfigured to provide the necessary access when the technician enters the password upon receipt from the engineer.

Advantageously, this technique enables the field technician to contact the engineer and request a temporary access level increase for the purpose of servicing a machine or system. Many other use cases and workflows for role escalation are also supported by the techniques disclosed herein and are in the scope of this disclosure.

Turning now to FIG. 3, a block diagram that illustrates an industrial automation environment 350 in an exemplary implementation is shown. Industrial automation environment 350 provides an example of an industrial automation environment that may be utilized to implement the temporary access processes disclosed herein, but other environments could also be used. Industrial automation environment 350 includes computing system 310, machine system 320, industrial controller 325, database system 330, and application integration platform 335. Machine system 320 and controller 325 are in communication over a communication link, controller 325 and database system 330 communicate over a communication link, database system 330 and application integration platform 335 communicate over a communication link, and application integration platform 335 and computing system 310 are in communication over a communication link. Note that there would typically be many more machine systems in most industrial automation environments, but the number of machine systems shown in FIG. 3 has been restricted for clarity.

Industrial automation environment 350 comprises an automobile manufacturing factory, food processing plant, oil drilling operation, microprocessor fabrication facility, or some other type of industrial enterprise. Machine system 320 could comprise a sensor, drive, pump, filter, drill, motor, robot, fabrication machinery, mill, printer, or any other industrial automation equipment, including their associated control systems. A control system comprises, for example, industrial controller 325, which could include automation controllers, programmable logic controllers (PLCs), programmable automation controllers (PACs), or any other controllers used in automation control. Additionally, machine system 320 could comprise other industrial equipment, such as a brew kettle in a brewery, a reserve of coal or other resources, or any other element that may reside in an industrial automation environment 350.

Machine system 320 continually produces operational data over time. The operational data indicates the current status of machine system 320, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 320 and/or controller 325 is capable of transferring the operational data over a communication link to database system 330, application integration platform 335, and computing system 210, typically via a communication network. Database system 330 could comprise a disk, tape, integrated circuit, server, or some other memory device. Database system 330 may reside in a single device or may be distributed among multiple memory devices.

Application integration platform 335 comprises a processing system and a communication transceiver. Application integration platform 335 may also include other components such as a router, server, data storage system, and power supply. Application integration platform 335 may reside in a single device or may be distributed across multiple devices. Application integration platform 335 may be a discrete system or may be integrated within other systems—including other systems within industrial automation environment 350. In some examples, application integration platform 335 could comprise a FactoryTalk® VantagePoint server system provided by Rockwell Automation, Inc.

The communication links over which data is exchanged between machine system 320, industrial controller 325, database system 330, application integration platform 335, and communication interface 308 of computing system 310 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as time-division multiplexing (TDM), internet protocol (IP), Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 310 may be representative of any computing apparatus, system, or systems on which the temporary access processes disclosed herein or variations thereof may be suitably implemented. Computing system 310 provides an example of a computing system that could be used as a either a server or a client device in some implementations, although such devices could have alternative configurations. Examples of computing system 310 include mobile computing devices, such as cell phones, tablet computers, laptop computers, notebook computers, and gaming devices, as well as any other type of mobile computing devices and any combination or variation thereof. Examples of computing system 310 also include desktop computers, server computers, and virtual machines, as well as any other type of computing system, variation, or combination thereof. In some implementations, computing system 310 could comprise a mobile device capable of operating in a server-like fashion which, among other uses, could be utilized in a wireless mesh network.

Computing system 310 includes processing system 301, storage system 303, software 305, communication interface 308, and user interface 309. Processing system 301 is operatively coupled with storage system 303, communication interface 308, and user interface 309. Processing system 301 loads and executes software 305 from storage system 303. Software 305 includes application 306 and operating system 307. Application 306 may include temporary access process 200 in some examples. When executed by computing system 310 in general, and processing system 301 in particular, software 305 directs computing system 310 to operate as described herein for temporary access process 200 or variations thereof. In this example, user interface 309 includes display system 311, which itself may be part of a touch screen that also accepts user inputs via touches on its surface. Computing system 310 may optionally include additional devices, features, or functionality not discussed here for purposes of brevity.

Turning now to FIG. 4, a block diagram is shown that illustrates computing system 400 in an exemplary implementation. Computing system 400 provides an example of computing systems 101, 102, 310, or any computing system that may be used to execute temporary access process 200 or variations thereof, although such systems could use alternative configurations. Computing system 400 includes processing system 401, storage system 403, software 405, communication interface 407, and user interface 409. User interface 409 comprises display system 408. Software 405 includes application 406 which itself includes temporary access process 200. Temporary access process 200 may optionally be implemented separately from application 406.

Computing system 400 may be representative of any computing apparatus, system, or systems on which application 406 and temporary access process 200 or variations thereof may be suitably implemented. Examples of computing system 400 include mobile computing devices, such as cell phones, tablet computers, laptop computers, notebook computers, and gaming devices, as well as any other type of mobile computing devices and any combination or variation thereof. Note that the features and functionality of computing system 400 may apply as well to desktop computers, server computers, and virtual machines, as well as any other type of computing system, variation, or combination thereof.

Computing system 400 includes processing system 401, storage system 403, software 405, communication interface 407, and user interface 409. Processing system 401 is operatively coupled with storage system 403, communication interface 407, and user interface 409. Processing system 401 loads and executes software 405 from storage system 403. When executed by computing system 400 in general, and processing system 401 in particular, software 405 directs computing system 400 to operate as described herein for temporary access process 200 or variations thereof. Computing system 400 may optionally include additional devices, features, or functionality not discussed herein for purposes of brevity.

Referring still to FIG. 4, processing system 401 may comprise a microprocessor and other circuitry that retrieves and executes software 405 from storage system 403. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 403 may comprise any computer readable media or storage media readable by processing system 401 and capable of storing software 405. Storage system 403 may include volatile and nonvolatile, removable and non-removable media implemented in any method or technology for storage of information, such as computer readable instructions, data structures, program modules, or other data. Storage system 403 may be implemented as a single storage device but may also be implemented across multiple storage devices or sub-systems co-located or distributed relative to each other. Storage system 403 may comprise additional elements, such as a controller, capable of communicating with processing system 401. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 409, processing system 401 loads and executes portions of software 405, such as temporary access process 200, to render a graphical user interface for application 406 for display by display system 408 of user interface 409. Software 405 may be implemented in program instructions and among other functions may, when executed by computing system 400 in general or processing system 401 in particular, direct computing system 400 or processing system 401 to receive a request from a user for a temporary access level increase to utilize protected functions of a control program. Software 405 may further direct computing system 400 or processing system 401 to generate an encrypted string comprising a temporary password authorized to access the protected functions of the control program. Software 405 may also direct computing system 400 or processing system 401 to provide the encrypted string to the user, wherein the user provides the encrypted string to an administrator and the administrator authenticates the user for the temporary access level increase, decrypts the temporary password, and provides the temporary password to the user. In addition, software 405 may direct computing system 400 or processing system 401 to receive from the user a login request with the temporary password authorized to access the protected functions of the control program, and responsively grant the temporary access level increase to allow the user to utilize the protected functions of the control program.

Software 405 may include additional processes, programs, or components, such as operating system software or other application software. Examples of operating systems include Windows®, iOS®, and Android®, as well as any other suitable operating system. Software 405 may also comprise firmware or some other form of machine-readable processing instructions executable by processing system 401.

In general, software 405 may, when loaded into processing system 401 and executed, transform computing system 400 overall from a general-purpose computing system into a special-purpose computing system customized to facilitate temporary escalation of access privileges for a control program associated with a machine system in an industrial automation environment as described herein for each implementation. For example, encoding software 405 on storage system 403 may transform the physical structure of storage system 403. The specific transformation of the physical structure may depend on various factors in different implementations of this description. Examples of such factors may include, but are not limited to the technology used to implement the storage media of storage system 403 and whether the computer-storage media are characterized as primary or secondary storage.

In some examples, if the computer-storage media are implemented as semiconductor-based memory, software 405 may transform the physical state of the semiconductor memory when the program is encoded therein. For example, software 405 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 400 is generally intended to represent a computing system with which software 405 is deployed and executed in order to implement application 406 and/or temporary access process 200 (and variations thereof). However, computing system 400 may also represent any computing system on which software 405 may be staged and from where software 405 may be distributed, transported, downloaded, or otherwise provided to yet another computing system for deployment and execution, or yet additional distribution. For example, computing system 400 could be configured to deploy software 405 over the internet to one or more client computing systems for execution thereon, such as in a cloud-based deployment scenario.

Communication interface 407 may include communication connections and devices that allow for communication between computing system 400 and other computing systems (not shown) or services, over a communication network 411 or collection of networks. In some implementations, communication interface 407 receives dynamic data 421 over communication network 411. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting non-touch gestures and other motions by a user, and other comparable input devices and associated processing elements capable of receiving user input from a user. Output devices such as display system 408, speakers, haptic devices, and other types of output devices may also be included in user interface 409. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate temporary escalation of access privileges for a machine control program associated with a machine system in an industrial automation environment, the method comprising:
   receiving, in the machine system and from a user, a login request comprising a username and password, wherein the username and the password are associated with the user and are stored on a machine authority of the machine system;
   granting, via the machine system, the user an access level to utilize one or more functions of the machine control program corresponding with a role of the user;
   receiving, in the machine system and from the user, a request for a temporary access level increase to utilize a protected function of the machine control program associated with the machine system, wherein the protected function corresponds with a temporary role distinct from the role of the user;
   in response to the request for the temporary access level increase, generating, via the machine system, an encrypted string comprising a temporary password authorized to allow the user to access the protected function of the machine control program;
   providing the encrypted string to the user, wherein the user provides the encrypted string to an administrator and the administrator authenticates the user for the temporary access level increase, decrypts the temporary password, and provides the temporary password to the user;
   receiving, in the machine system and from the user, an elevated login request comprising the username and the temporary password authorized to allow the user to access the protected function of the machine control program; and
   responsive to receiving the elevated login request, granting, via the machine system, the temporary access level increase to allow the user to utilize the protected function of the machine control program.

2. The method of claim 1 wherein granting the temporary access level increase comprises granting the temporary access level increase for only a single elevated login request.

3. The method of claim 1 wherein generating the encrypted string further comprises generating the encrypted string comprising the temporary role.

4. The method of claim 1 wherein the machine control program comprises controller program code that directs an industrial controller to drive the machine system.

5. The method of claim 1 wherein granting the temporary access level increase comprises granting the temporary access level increase for a predetermined time period.

6. The method of claim 1 wherein receiving the request for the temporary access level increase comprises receiving the request for the temporary access level increase via a function of the one or more functions of the machine control program corresponding with the role of the user.

7. One or more computer-readable storage media having program instructions stored thereon to facilitate temporary escalation of access privileges for a machine control program associated with a machine system in an industrial automation environment, wherein the program instructions, when executed by a computing system, direct the computing system to at least:
   receive, in the machine system and from a user, a login request comprising a username and password, wherein the username and the password are associated with the user and are stored on a machine authority of the machine system;
   grant, via the machine system, the user an access level to utilize one or more functions of the machine control program corresponding with a role of the user;
   receive, in the machine system, a request from the user for a temporary access level increase to utilize protected functions of the machine control program associated with the machine system, wherein the protected functions correspond with a temporary role distinct from the role of the user;
   in response to the request for the temporary access level increase, generate, via the machine system, an encrypted string comprising a temporary password authorized to allow the user to access the protected functions of the machine control program;
   provide the encrypted string to the user, wherein the user provides the encrypted string to an administrator and the administrator authenticates the user for the temporary access level increase, decrypts the temporary password, and provides the temporary password to the user; and
   receive, in the machine system and from the user, an elevated login request comprising the username and the temporary password authorized to allow the user to access the protected functions of the machine control program, and responsively grant, via the machine system, the temporary access level increase to allow the user to utilize the protected functions of the machine control program.

8. The one or more computer-readable storage media of claim 7 wherein the program instructions that direct the computing system to grant the temporary access level increase direct the computing system to grant the temporary access level increase for only a single elevated login request.

9. The one or more computer-readable storage media of claim 7 wherein the program instructions that direct the computing system to generate the encrypted string direct the computing system to generate the encrypted string comprising the temporary role.

10. The one or more computer-readable storage media of claim 7 wherein the program instructions that direct the computing system to grant the temporary access level increase direct the computing system to grant the temporary access level increase for a predetermined time period.

11. The one or more computer-readable storage media of claim 7 wherein the program instructions that direct the computing system to grant the temporary access level increase direct the computing system to grant the temporary access level increase for a predetermined number of elevated login requests.

12. The one or more computer-readable storage media of claim 7 wherein the program instructions that direct the computing system to receive the request for the temporary access level increase direct the computing system to receive the request for the temporary access level increase via a function of the one or more functions of the machine control program corresponding with the role of the user.

13. An apparatus to facilitate temporary escalation of access privileges for a machine control program associated with a machine system in an industrial automation environment, the apparatus comprising:
   one or more computer-readable storage media; and
   program instructions stored on the one or more computer-readable storage media that, when executed by a processing system, direct the processing system to at least:
      receive, in the machine system and from a user, a login request comprising a username and password, wherein the username and the password are associated with the user and are stored on a machine authority of the machine system;
      grant, via the machine system, the user an access level to utilize one or more functions of the machine control program corresponding with a role of the user;
      receive, in the machine system, a request from the user for a temporary access level increase to utilize a protected function of the machine control program associated with the machine system, wherein the protected function corresponds with a temporary role distinct from the role of the user;
      in response to the request for the temporary access level increase, generate, via the machine system, an encrypted string comprising a temporary password authorized to allow the user to access the protected function of the machine control program;
      provide the encrypted string to the user, wherein the user provides the encrypted string to an administrator and the administrator authenticates the user for the temporary access level increase, decrypts the temporary password, and provides the temporary password to the user; and
      receive, in the machine system and from the user, an elevated login request comprising the username and the temporary password authorized to allow the user to access the protected function of the machine control program, and responsively grant, via the machine system, the temporary access level increase to allow the user to utilize the protected function of the machine control program.

14. The apparatus of claim 13 wherein the program instructions direct the processing system to generate the encrypted string by directing the processing system to generate the temporary password authorized to access the protected function of the machine control program and include the temporary password in the encrypted string.

15. The apparatus of claim 13 wherein the program instructions direct the processing system to generate the encrypted string by directing the processing system to generate the encrypted string comprising the temporary password and the temporary access level increase requested by the user.

16. The apparatus of claim 13 wherein the program instructions direct the processing system to grant the temporary access level increase for only a single elevated login request.

17. The apparatus of claim 13 wherein the program instructions direct the processing system to grant the temporary access level increase for predetermined number of elevated login requests.

18. The apparatus of claim 13 wherein the program instructions direct the processing system to grant the temporary access level increase for a predetermined period of time.

19. The apparatus of claim 13 wherein the program instructions direct the processing system to generate the encrypted string by system to generate the encrypted string comprising the temporary password and the temporary role.

20. The apparatus of claim 13 wherein the program instructions direct the processing system to receive the request for the temporary access level increase by directing the processing system to receive the request for the temporary access level increase via a function of the one or more functions of the machine control program corresponding with the role of the user.

* * * * *